United States Patent
Creamer et al.

(10) Patent No.: US 7,542,560 B2
(45) Date of Patent: Jun. 2, 2009

(54) GUEST SERVICES MANAGEMENT SERVICE

(75) Inventors: Thomas E. Creamer, Boca Raton, FL (US); Neil Katz, Parkland, FL (US); Zygmunt A. Lozinski, Paperworth Everard (GB); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/744,249

(22) Filed: Dec. 22, 2003

(65) Prior Publication Data

US 2005/0135590 A1 Jun. 23, 2005

(51) Int. Cl.
*H04M 3/00* (2006.01)
(52) U.S. Cl. .................. 379/265.01; 379/265.02; 379/265.09; 379/265.13
(58) Field of Classification Search ............ 379/265.09, 379/91.01, 265.01, 265.02, 265.13
See application file for complete search history.

(56) References Cited

U.S. PATENT DOCUMENTS

| | | | | |
|---|---|---|---|---|
| 4,734,858 | A | * | 3/1988 | Schlafly ................... 705/26 |
| 4,752,876 | A | | 6/1988 | Couch et al. |
| 5,222,120 | A | | 6/1993 | McLeod et al. |
| 5,592,538 | A | | 1/1997 | Kosowsky et al. |
| 5,651,058 | A | * | 7/1997 | Hackett-Jones et al. .. 379/93.13 |
| 5,752,191 | A | | 5/1998 | Fuller et al. |
| 6,021,190 | A | | 2/2000 | Fuller et al. |
| 6,047,273 | A | * | 4/2000 | Vaghi ........................ 705/410 |
| 6,069,891 | A | | 5/2000 | Mndalia et al. |
| 6,078,580 | A | | 6/2000 | Mandalia et al. |
| 6,377,560 | B1 | | 4/2002 | Dailey |
| 6,418,216 | B1 | * | 7/2002 | Harrison et al. ........ 379/208.01 |
| 6,453,164 | B1 | | 9/2002 | Fuller et al. |
| 6,622,016 | B1 | | 9/2003 | Sladek et al. |
| 6,724,869 | B2 | | 4/2004 | Chapman et al. |
| 7,022,017 | B1 | | 4/2006 | Halbritter et al. |
| 2003/0083889 | A1 | | 5/2003 | Macklin |
| 2004/0075679 | A1 | | 4/2004 | Carter et al. |
| 2004/0116115 | A1 | | 6/2004 | Ertel |

OTHER PUBLICATIONS

Lozinski, Zygmunt, *Parlay/OSA—A New Way to Create Wireless Services*, IBM, submitted to "IEC Mobile Wireless Data" May 15, 2003, revised Jun. 1, 2003.

* cited by examiner

*Primary Examiner*—Rasha S Al Aubaidi
(74) *Attorney, Agent, or Firm*—Richard A. Tomlin, Esq.; Steven M. Greenberg, Esq.; Carey Rodriguez Greenberg & Paul LLP

(57) ABSTRACT

A method, system and apparatus for managing guest services to a telephone subscriber using identifying information provided through the PSTN to a guest services management center. In accordance with the present invention, a guest services management method can include prompting a guest through an established telephone call to manage at least one guest service without first prompting the guest for identifying information. The method further can include managing the guest service without accessing guest information derived through the established telephone call.

9 Claims, 3 Drawing Sheets

GUEST SERVICES MANAGEMENT SERVICE

BACKGROUND OF THE INVENTION

1. Statement of the Technical Field

The present invention relates to the management of third party guest services for a telephone subscriber, and more particularly to the management of third party guest services based upon call processing provided in a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing guest information or additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs), databases containing service logic and subscriber information which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the business name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center and in the guest service industry. For instance, oftentimes a services guest such as a hotel or restaurant or theater guest (to name but a few) will attempt to manage the extent of the services provided to the guest by contacting the guest services provider. The management of the guest services can range from determining a time when the services are to expire, to specifying the particulars of the service such as seating, to extending the duration of the services provided by the services provider.

As the telephonic modification of the terms of service provided to the guest can be difficult to authenticate without visually viewing the guest, the service provider can be cautious and usually permits management of the guest services only through a trusted form of communications such as through an interactive television in a guest room, or through an internal telephone network which is private and, hence, trusted to the services provider. When contacting the services provide outside of the premises, however, the services provider (or an agent for the services provider) can require the guest to produce ample evidence of the identity of the guest. Generally, the evidence can include name, home address, phone number, social security number, reservation number, account number, billing address, credit card number, credit card authorization code, a PIN code, and countless other forms of identifying information.

Of course, for the typical services guest, access to this type of information can be difficult, particularly when the guest cannot access the requisite paperwork. As a result, services guests are forced to speak with several layers of guest service representatives without a guarantee that the guest will be successful in managing the guest services at issue. In consequence, guests can become irritated conversing with one or more guest service representatives, an interactive voice response system, or both simply to provide identifying information sufficient to manage the guest services.

SUMMARY OF THE INVENTION

The present invention addresses the deficiencies of the art in respect to the management of third party guest services to a telephone subscriber and provides a novel and non-obvious method, system and apparatus for managing guest services to a telephone subscriber using identifying information provided through the PSTN to a guest services management center. In accordance with the present invention, a guest services management method can include prompting a guest through an established telephone call to manage at least one guest service without first prompting the guest for identifying information. The method further can include managing the guest service without accessing guest information derived through the established telephone call.

In a preferred aspect of the invention, the prompting step can include the step of prompting a guest through an established telephone call to extend an existing guest service without first prompting the guest for identifying information. Similarly, the managing step can include the step of extending a existing guest service without accessing guest information derived through the phone call. Finally, the method optionally can include the step of transferring the phone call to a customer service representative responsive to a request for live help by the guest.

In a guest services management system, a guest services management system can be configured to manage guest services based upon identifying information associated with guests associated with the guest services. A multiplicity of guests calling the guest services management system over a PSTN to manage respective guest services further can be provided. Finally, logic can be disposed within the PSTN, coupled to the guest services management system over a data communications network, and configured to obtain the identifying information in the PSTN and to provide the obtained identifying information to the guest services management system through the data communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for managing guest services through a PSTN. As used herein, guest services can include any service provided to a guest of the services provider, such as a hotel guest, a restaurant patron, or a theater patron. Exemplary guest services can include the booking of a hotel room, the reservation of court time for a tennis court, the seat assignment for a sporting or theatrical event, or a meal reservation. The management of the guest services can be performed by the provider of the guest services, or by a guest services agent acting on behalf of the provider of the guest services.

In accordance with the present invention, a guest can contact the guest service over a PSTN to manage the provision of guest services. When attempting to place the call, the call can be intercepted within the PSTN and identifying information for the calling guest can be extracted from a database within the PSTN. The identifying information can be provided over a data communications network to the guest services management service. Using the identifying information received over the data communications network, the guest services management service can retrieve information regarding the provision of guest services to the calling guest and also, the guest services management service can instantly authenticate the calling guest based upon the identifying information.

As the call from the guest is completed over the PSTN, the identifying information, and in particular, the retrieved information, can be correlated to the completed call such that an operator or an automated call center for the guest services management service can access the information through the data communications network while processing the completed call from the guest. Significantly, as the identifying information can be resolved externally to the guest services provider from a trusted source within the PSTN, the guest services management service can manage the provision of guest services without first prompting the guest for identifying information.

Figure 1:
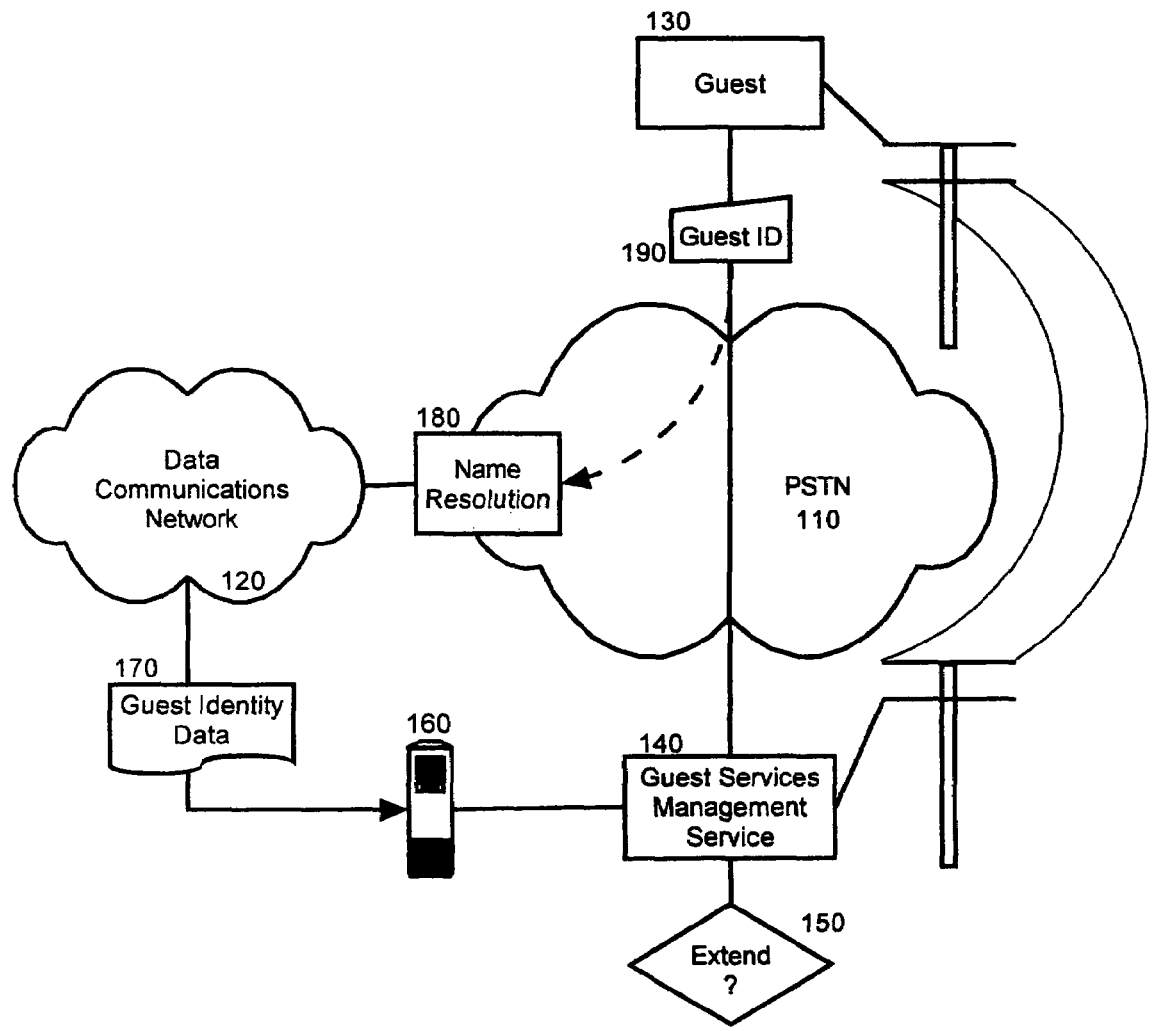
FIG. 1 is a block diagram illustrating a process for managing guest services through a PSTN according to the inventive arrangements.

In further illustration, FIG. 1 is a block diagram illustrating a system, method and process for managing guest services according to the inventive arrangements. Specifically, a guest 130 having been provided one or more guest services by a guest services provider can be coupled telephonically to a guest services management system 140 by way of the PSTN 110. As the guest 130 initiates the telephone call in the PSTN 110, a name resolution adapter 180 disposed within the PSTN 110 can capture the guest identification 190 for the guest 130 to identify the guest 130.

Using the guest identification 190, the name resolution adapter can produce corresponding identification data 170 for the guest 130, for instance a name, address, phone number, credit card number, or account number, to name a few. In this regard, the name resolution adapter 180 can query one or more databases disposed within the PSTN 110 to obtain corresponding identifying data 170 for the guest identification 190. Once the name resolution adapter 180 has acquired the identification data 170, the name resolution adapter 180 can provide the identification data 170 to an enterprise application 160 associated with the guest services management system 140 over the data communications network 120. Concurrently, the call between the guest 130 and the guest services management system 140 can be established over the PSTN 110.

Once the enterprise application 160 has received the identification data 170 for the guest 130, the enterprise application 160 can use the identification data 170 to obtain the guest records for the guest 130. Importantly, the enterprise application 160 can retrieve the guest records without first having annoyingly prompted the guest 130 over the PSTN 110 for identifying information. In any case, guest services management logic 150 can prompt the guest 130 to manage the guest services provided to the guest 130. In this regard, the guest 130 can be prompted manually through the voice of a human operator, or automatically through an interactive voice response system or through a voice browser the operation of which is well known in the art.

In particular, the guest 130 can select to extend the duration of specified guest services provided to the guest 130, such as requesting a late checkout from a hotel. Also, the guest 130 can modify the terms of specified guest services, such as a seating time or location within a restaurant. In any case, the foregoing represent mere examples of the type of guest services management which can be provided in the guest services management system 140. Responsive to any change to the guest services provided to the guest 130, the enterprise application 160 can update the guest records accordingly. Remarkably, the foregoing guest services management process can be performed over the PSTN without requiring a single identifying prompt, or the resolution of caller identifying data in the enterprise application 160.

Figure 2:
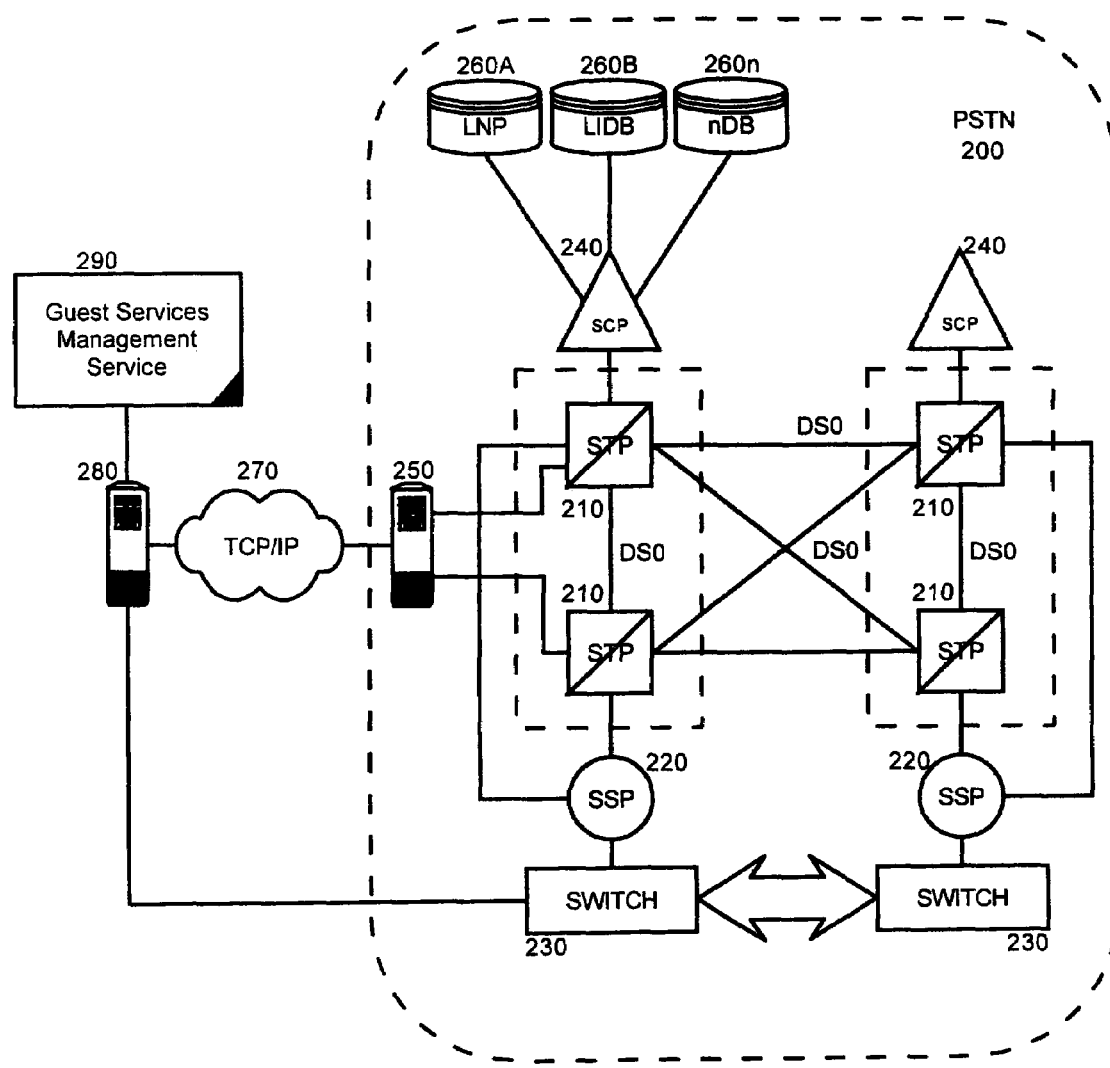
FIG. 2 is a schematic illustration of a system for managing guest services using identifying information acquired within a PSTN; and, FIG. 3 is a flow chart illustrating a process for managing guest services in the system of FIG. 2.

To further illustrate the preferred embodiments of the present invention, FIG. 2 is a schematic illustration of a system for managing a guest service using identifying information acquired within a PSTN. As shown in FIG. 2, a system for managing a guest service using identifying information acquired within a PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers. For example, the databases 260A, 260B, 260n can include a local number portability (LNP) database, a LIDB, or any other such database which can be accessed within an SCP 240.

Notably, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Notably, a name resolution adapter 250 can be coupled to the out-of-band network comprised of inter-connected STPs 210 to access data and logic through the SCP 240 through an exchange of messages such as TCAP messages. The name resolution adapter 250 can include a gateway node 250 having both an interface to the PSTN 200 and also an interface to a data communications network 270 such as an Internet Protocol driven network. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 250 can monitor calls placed to a switch 230 to which the enterprise application 280 has been coupled. As calls are received in the switch 230, the name resolution adapter 250 can receive respective TCAP messages from the STP 210 coupled to the switch 230. Using the TCAP messages, the name resolution adapter 250 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 250 has received the identity of the caller from the LIDB 260B, the name resolution adapter 250 can transmit the identity to the enterprise application 280 over the data communications network 270. The enterprise application 280 subsequently can correlate the caller identity received from the name resolution adapter 250 with a corresponding call received through the switch 230.

In a preferred aspect of the present invention, guest services management logic 290 can be coupled to the enterprise application 280. The guest service management logic 290 can provide a facility through which telephone subscribers can manage the provisioning of guest services without requiring the telephone subscribers to respond to exhaustive prompting necessary to identify the telephone subscribers. In further illustration, FIG. 3 is a flow chart illustrating a process for managing guest services in the system of FIG. 2.

Figure 3:
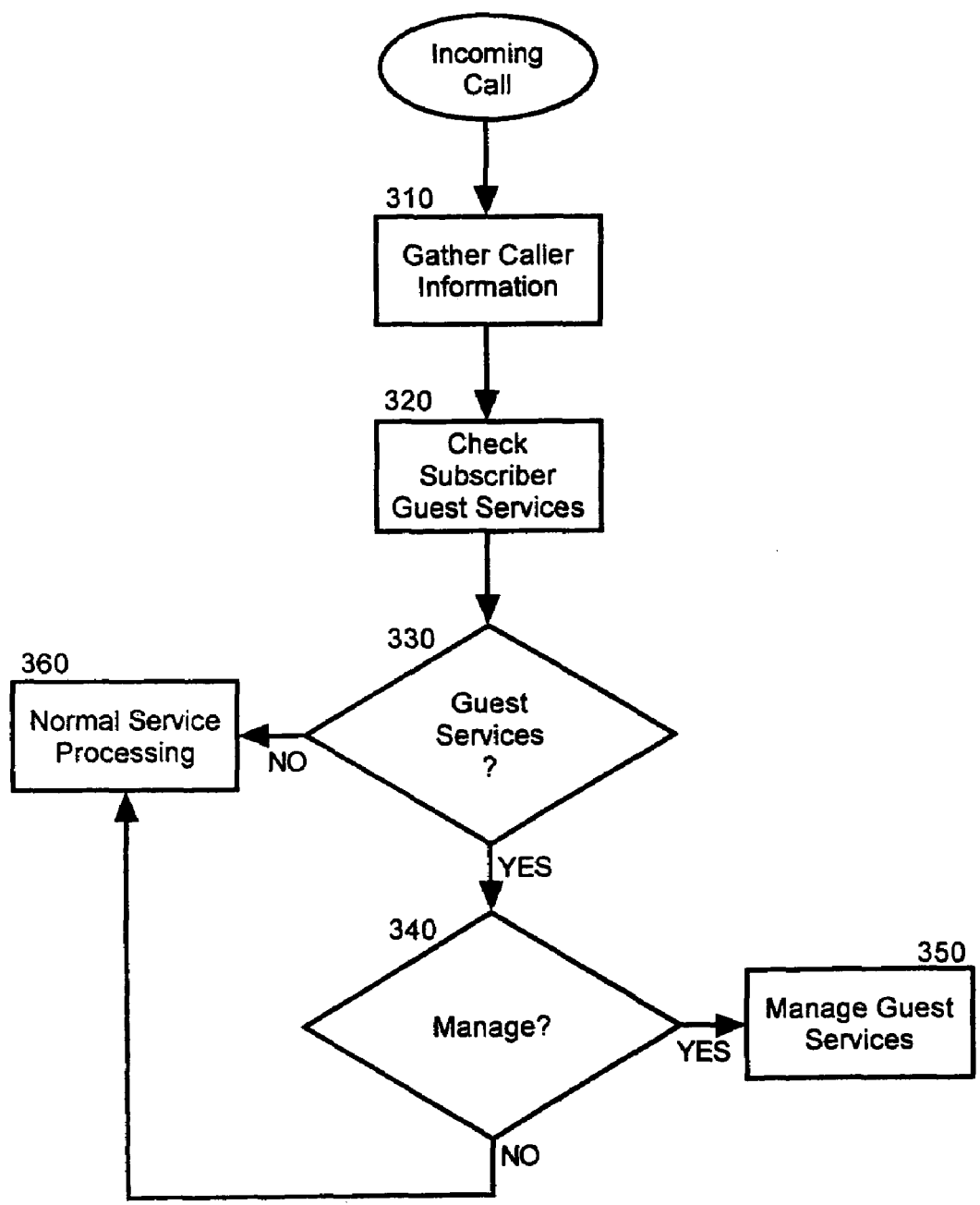

As shown in FIG. 3, a calling party known to the PSTN can be identified as attempting to establish a call to a switch associated with the guest services management system of the present invention. In this regard, the PSTN internally can resolve the identity of the caller based upon the phone number corresponding to the call attempt. Subsequently, the PSTN can communicate the identity of the caller to the guest services management system. Specifically, in block 310 the PSTN can provide the identity of the caller through a computer communications network coupled to the credit card activation management system. Concurrently, the PSTN can establish the call without regard to the name resolution activities occurring through the data communications network and a correlation can be established between the call and the identity of the caller.

In block 320, a database associated with the guest services management system can be queried to retrieve customer data corresponding to the identity of the caller and also to retrieve a set of one or more guest services provisioned for the customer. Subsequently, in decision block 330, it can be determined if the calling party is a registered customer able to be processed by the guest services management system. If not, in block 360 the call can be transferred to a customer service representative. Otherwise, in decision block 340 the caller can be prompted to manage one or more of the guest services, including, for instance, whether the caller would like to extend the duration of an existing guest service. If, in decision block 340, the caller desires to manage the guest services, in block 350 the guest services can be managed accordingly. Otherwise, the call be transferred to a customer service representative.

It is to be understood by the skilled artisan that the process of FIG. 3 merely represents an exemplary process for use in accordance with the present invention and that many variations of the exemplary process will fall within the scope of the present invention. For example, the caller can be permitted to add new guest services, to terminate on-going guest services, or to extend the duration of existing guest services. Moreover, the caller can modify the terms of an existing or prospective guest service such as seating arrangements and the like.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A guest services management method comprising the steps of:
   prompting a guest through an established telephone call over a public switched telephone network (PSTN) to manage at least one guest service without first prompting said guest for identifying information;
   identifying the guest from within the PSTN but outside of the telephone call over the PSTN;
   receiving identifying information for the guest from over a data communications network outside of the PSTN and the telephone call; and,
   managing said at least one guest service using the identifying information for the guest without accessing guest information derived through said established telephone call.

2. The method of claim 1, wherein said prompting step comprises the step of prompting a guest through an established telephone call to extend an existing guest service without first prompting said guest for identifying information.

3. The method of claim 1, wherein said managing step comprises the step of extending an existing guest service without accessing guest information derived through said phone call.

4. The method of claim 1, further comprising the step of transferring said phone call to a customer service representative responsive to a request for live help by said guest.

5. A guest services management system comprising:
   a guest services management system configured to manage guest services based upon identifying information for guests associated with said guest services;
   a plurality of guests calling said guest services management system over a public switched telephone network (PSTN) to manage respective guest services; and,
   logic disposed within said PSTN, coupled to said guest services management system over a data communications network, and configured to obtain said identifying information in said PSTN and to provide said obtained identifying information to said guest services management system through said data communications network to said guest management system outside of telephone calls placed by the guests to the guest services management system.

6. A machine readable storage having stored thereon a computer program for guest services management, the computer program comprising a routine set of instructions which when executed by a machine cause the machine to perform the steps of:
   prompting a guest through an established telephone call over a public switched telephone network (PSTN) to manage at least one guest service without first prompting said guest for identifying information;
   identifying the guest from within the PSTN but outside of the telephone call over the PSTN;
   receiving identifying information for the guest from over a data communications network outside of the PSTN and the telephone call; and,
   managing said at least one guest service using the identifying information for the guest without accessing guest information derived through said established telephone call.

7. The machine readable storage of claim 6, wherein said prompting step comprises the step of prompting a guest through an established telephone call to extend an existing guest service without first prompting said guest for identifying information.

8. The machine readable storage of claim 6, wherein said managing step comprises the step of extending an existing guest service without accessing guest information derived through said phone call.

9. The machine readable storage of claim 6, further comprising the step of transferring said phone call to a customer service representative responsive to a request for live help by said guest.

* * * * *